(12) United States Patent
Wong et al.

(10) Patent No.: US 12,589,802 B2
(45) Date of Patent: Mar. 31, 2026

(54) COLLABORATIVE STEERING SYSTEM FOR A VEHICLE

(71) Applicant: GM GLOBAL TECHNOLOGY OPERATIONS LLC, Detroit, MI (US)

(72) Inventors: Kin Man Michael Wong, Thornhill (CA); Ben MacCallum, Toronto (CA); Puneet Bagga, Etobicoke (CA); Parisa Mahvelatishamsabadi, North York (CA); Reza Zarringhalam, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 175 days.

(21) Appl. No.: 18/437,696

(22) Filed: Feb. 9, 2024

(65) Prior Publication Data

US 2025/0256775 A1 Aug. 14, 2025

(51) Int. Cl.
*B62D 15/02* (2006.01)
*B60W 30/09* (2012.01)
(Continued)

(52) U.S. Cl.
CPC ........... *B62D 15/025* (2013.01); *B60W 30/09* (2013.01); *B60W 30/0953* (2013.01);
(Continued)

(58) Field of Classification Search
CPC .............. B62D 15/025; B62D 15/0255; B62D 15/026; B62D 15/0265; B60W 30/09;
(Continued)

(56) References Cited

U.S. PATENT DOCUMENTS 5,631,833 A * 5/1997 Wada ................... B62D 5/0463
701/42
5,925,082 A * 7/1999 Shimizu ................... B62D 6/00
180/443

(Continued)

FOREIGN PATENT DOCUMENTS

DE 102020104265 A1 8/2020
DE 102020125982 A1 4/2021
DE 102022126311 A1 9/2023

*Primary Examiner* — Lindsay M Low
*Assistant Examiner* — Brian R Kirby
(74) *Attorney, Agent, or Firm* — Quinn IP Law

(57) ABSTRACT

A steering system for a vehicle that includes a driver-controllable steering device; a power steering actuator coupled to a steerable vehicle wheel; an advanced driver assistance system (ADAS) including a spatial monitoring system; and a steering controller. A steering control routine determines a target path and a target trajectory for the vehicle based upon an input from the spatial monitoring system; determines a driver steering command; determines external factors related to the target path and the target trajectory; determines a weighting factor for the driver steering command based upon the plurality of external factors; determines a steering angle command based upon the driver steering command, the weighting factor for the driver steering command, the target path, and the target trajectory; and controls the power steering actuator to control the steerable wheel responsive to the steering angle command.

20 Claims, 7 Drawing Sheets

(51) Int. Cl.

| | |
|---|---|
| *B60W 30/095* | (2012.01) |
| *B60W 30/10* | (2006.01) |
| *B60W 30/12* | (2020.01) |
| *B60W 30/17* | (2020.01) |

(52) U.S. Cl.
CPC ............ *B60W 30/10* (2013.01); *B60W 30/12* (2013.01); *B60W 30/17* (2013.01); *B62D 15/0255* (2013.01); *B62D 15/026* (2013.01)

(58) Field of Classification Search
CPC .. B60W 30/0953; B60W 30/10; B60W 30/12; B60W 30/17

See application file for complete search history.

(56) References Cited

U.S. PATENT DOCUMENTS

| | | | | |
|---|---|---|---|---|
| 10,399,595 | B2* | 9/2019 | Moretti | .................... B62D 1/28 |
| 2005/0021204 | A1* | 1/2005 | Kudo | ................... B62D 15/025 |
| | | | | 340/439 |
| 2011/0015850 | A1* | 1/2011 | Tange | ................... B60W 30/12 |
| | | | | 701/116 |
| 2012/0185132 | A1* | 7/2012 | Kezobo | ............... B62D 5/0472 |
| | | | | 701/41 |
| 2014/0277945 | A1* | 9/2014 | Chandy | ................... B62D 6/00 |
| | | | | 701/41 |
| 2015/0158528 | A1* | 6/2015 | Moshchuk | ......... B62D 15/0265 |
| | | | | 701/41 |
| 2015/0210318 | A1* | 7/2015 | Takeda | ................... B62D 6/008 |
| | | | | 701/41 |
| 2016/0252903 | A1* | 9/2016 | Prokhorov | ........ B60W 50/0098 |
| | | | | 701/23 |
| 2017/0015348 | A1* | 1/2017 | Sasaki | ..................... B62D 6/00 |
| 2017/0106903 | A1* | 4/2017 | Moretti | ............... B62D 5/0472 |
| 2018/0229769 | A1* | 8/2018 | Mardh | ................ B62D 15/025 |

* cited by examiner

COLLABORATIVE STEERING SYSTEM FOR A VEHICLE

INTRODUCTION

Steering systems are employed to provide directional control of a vehicle.

SUMMARY

The concepts described herein include a steering system for a vehicle having an advanced driver assistance system (ADAS), which comprehends a driver steering command and employs a predictive model in trajectory tracking to collaboratively control actuator(s) to effect vehicle steering.

An aspect of the disclosure may include a steering system for a vehicle that includes a driver-controllable steering device; a power steering actuator coupled to a steerable wheel; an advanced driver assistance system (ADAS) including a spatial monitoring system; and a steering controller. The steering controller is in communication with the steering device, the power steering actuator, and the ADAS. The steering controller includes a collaborative steering subsystem that is operative to: determine, via the steering device, a driver steering command; determine, via the ADAS, a target path and a target trajectory for the vehicle based upon an input from the spatial monitoring system; determine a second steering command based upon the target path and the target trajectory for the vehicle; determine, via the spatial monitoring system, a plurality of external factors related to the target path and the target trajectory; determine a weighted driver steering command based upon the plurality of external factors and the driver steering command; determine, via a steering control routine, a steering angle command based upon the weighted driver steering command and the second steering command; and control the power steering actuator to control the steerable wheel responsive to the steering angle command.

Another aspect of the disclosure may include the power steering actuator being a steer-by-wire steering system.

Another aspect of the disclosure may include the power steering actuator being a rack-and-pinion steering system.

Another aspect of the disclosure may include a navigation system, wherein the steering control routine is executable to determine, via the ADAS, the target path and a target trajectory for the vehicle based upon the input from the spatial monitoring system and an input from the navigation system.

Another aspect of the disclosure may include the collaborative steering subsystem being operative to determine the weighted driver steering command based upon the plurality of external factors, including the steering control routine being operative to: determine a first weighting factor associated with a first steering direction based upon the plurality of external factors; determine a second weighting factor associated with a second steering direction that is opposite to the first steering direction based upon the plurality of external factors; and determine the weighted driver steering command based upon the driver steering command, the first weighting factor for the driver steering command, and the second weighting factor for the driver steering command.

Another aspect of the disclosure may include the steering control routine being operative to modify the second steering command in response to the weighted driver steering command and the second steering command.

Another aspect of the disclosure may include the plurality of external factors related to the target path and the target trajectory being one of a distance to a perceived side threat to the vehicle, or a distance to a perceived obstacle in the target path of the vehicle.

Another aspect of the disclosure may include the steering control routine including a driver steering alert routine operable to detect occurrence of a constraint violation of the target path or target trajectory for the vehicle, and communicate a control action to the driver based upon the constraint violation.

Another aspect of the disclosure may include the steering control routine including a steering emulator routine operable to generate a steering wheel torque command, wherein the steering wheel torque command is employed to control the steering wheel to provide a torque resistance in response to the driver steering command.

Another aspect of the disclosure may include the steering control routine executing a model predictive controller routine (MPC) to determine the steering angle command based upon the driver steering command, the weighted driver steering command, and the second steering command.

Another aspect of the disclosure may include a method for steering a vehicle having an advanced driver assistance system (ADAS). The method includes equipping the vehicle with a driver-controllable steering device, a power steering actuator coupled to a steerable vehicle wheel, a spatial monitoring system, and a navigation system; determining, via the steering device, a driver steering command; monitoring, via the spatial monitoring system, an area that is proximal to the vehicle; determining, via a navigation system, travel route information; determining, via the ADAS, a target path and a target trajectory for the vehicle based upon an input from the spatial monitoring system and the travel route information from the navigation system; determining a second steering command based upon the target path and the target trajectory; determining, via the spatial monitoring system, a plurality of external factors related to the target path and the target trajectory; determining a weighted driver steering command based upon the plurality of external factors; determining a steering angle command based upon the weighted driver steering command and the second steering command; and controlling the power steering actuator to control the steerable wheel responsive to the steering angle command.

Another aspect of the disclosure may include a method for controlling steering on a vehicle that includes equipping the vehicle with a driver-controllable steering device, a power steering actuator coupled to a steerable vehicle wheel, an advanced driver assistance system (ADAS) including a spatial monitoring system, and a navigation system; determining, via the ADAS and the navigation system, a target path and a target trajectory for the vehicle; determining a second steering command based upon the target path and the target trajectory for the vehicle; determining, via the steering device, a driver steering command; determining, via the spatial monitoring system, a plurality of external factors related to the target path and the target trajectory; determining a weighted driver steering command based upon the plurality of external factors; executing a model predictive controller routine (MPC) to determine a steering angle command based upon the weighted driver steering command, the target path, and the target trajectory; and controlling the power steering actuator to control the steerable wheel responsive to the steering angle command.

Another aspect of the disclosure may include the steering control routine being executable to determine the weighting factor for the driver steering command based upon the plurality of external factors including determining a first weighting function associated with a first steering direction, and determining a second weighting function associated with a second steering direction that is opposite to the first steering direction. In one embodiment, the first steering direction is a rightward steering direction, and the second steering direction is a leftward steering direction. In one embodiment, the first steering direction is a leftward steering direction and the second steering direction is a rightward steering direction.

The concepts described herein comprehend a driver steering command in trajectory tracking employing a model predictive controller (MPC). The driver steering command is incorporated in an objective function and a prediction model in the MPC. The weight of the objective function may be adapted in response to activation of an active driver assist mode, driver preference, external conditions, and control performance. Advanced warning may be issued to the driver of an impending constraint violation to allow the driver to assist in vehicle control to maintain control beyond normal operation envelope. A feedback function provides collaborative steering torque overlay feedback to the driver in a steer-by-wire system, and thus enables a unified and intuitive collaborative steering strategy to be applied to all automated driving assist feature and steering controller.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
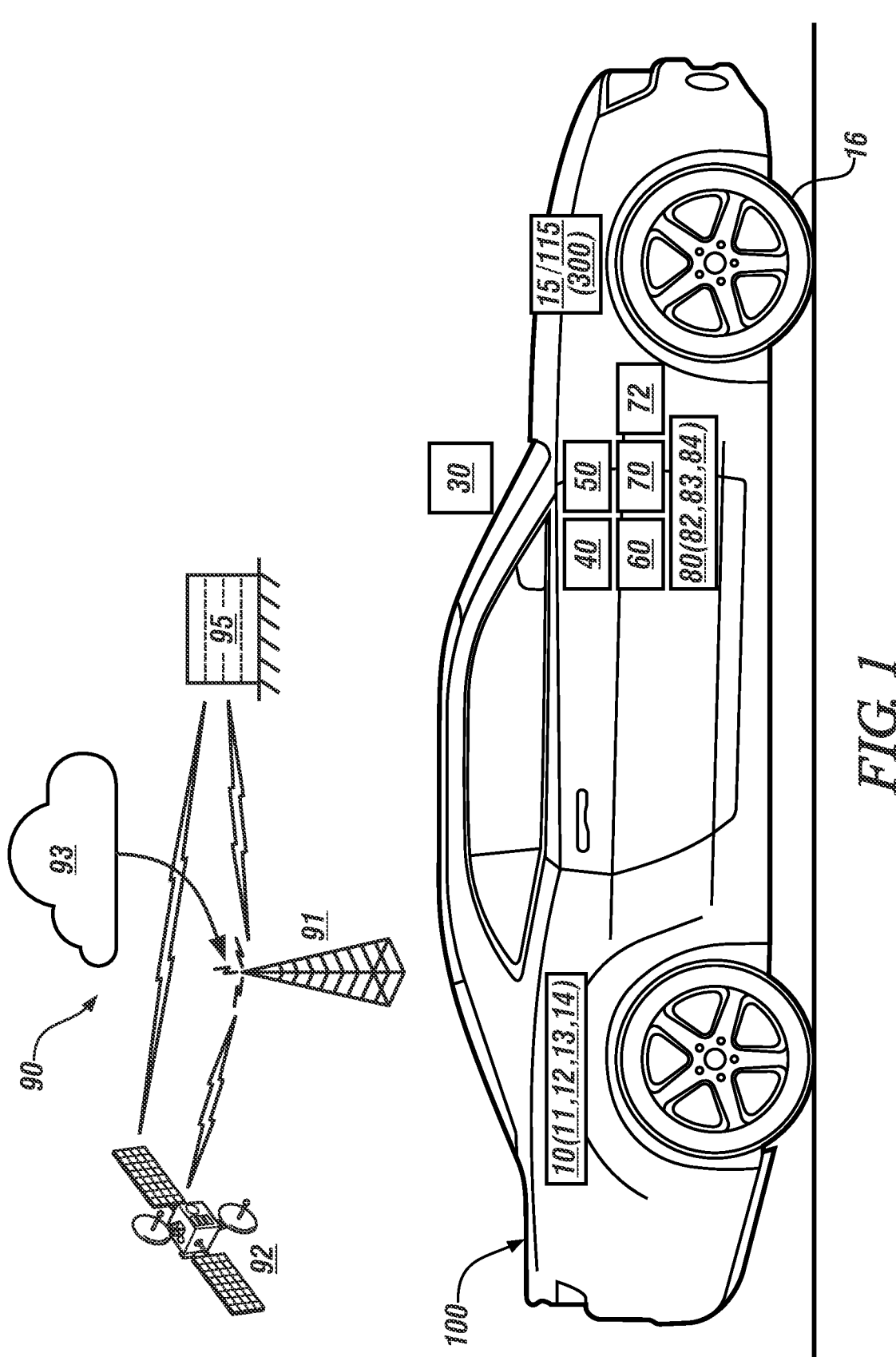
FIG. 1 pictorially illustrates a vehicle, in accordance with the disclosure.

The appended drawings are not necessarily to scale, and may present a somewhat simplified representation of various features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but merely represents possible embodiments thereof. In addition, while numerous specific details are set forth in the following description in order to provide a thorough understanding of the embodiments disclosed herein, some embodiments may be practiced without some of these details. Moreover, for the purpose of clarity, certain technical material that is understood in the related art has not been described in detail in order to avoid unnecessarily obscuring the disclosure.

For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

The following detailed description is merely exemplary in nature and is not intended to limit the application and uses. Furthermore, there is no intention to be bound by an expressed or implied theory presented herein. Throughout the drawings, corresponding reference numerals indicate like or corresponding parts and features.

As employed herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

The use of ordinals such as first, second and third does not necessarily imply a ranked sense of order, but rather may distinguish between multiple instances of an act or structure.

Figure 2A:
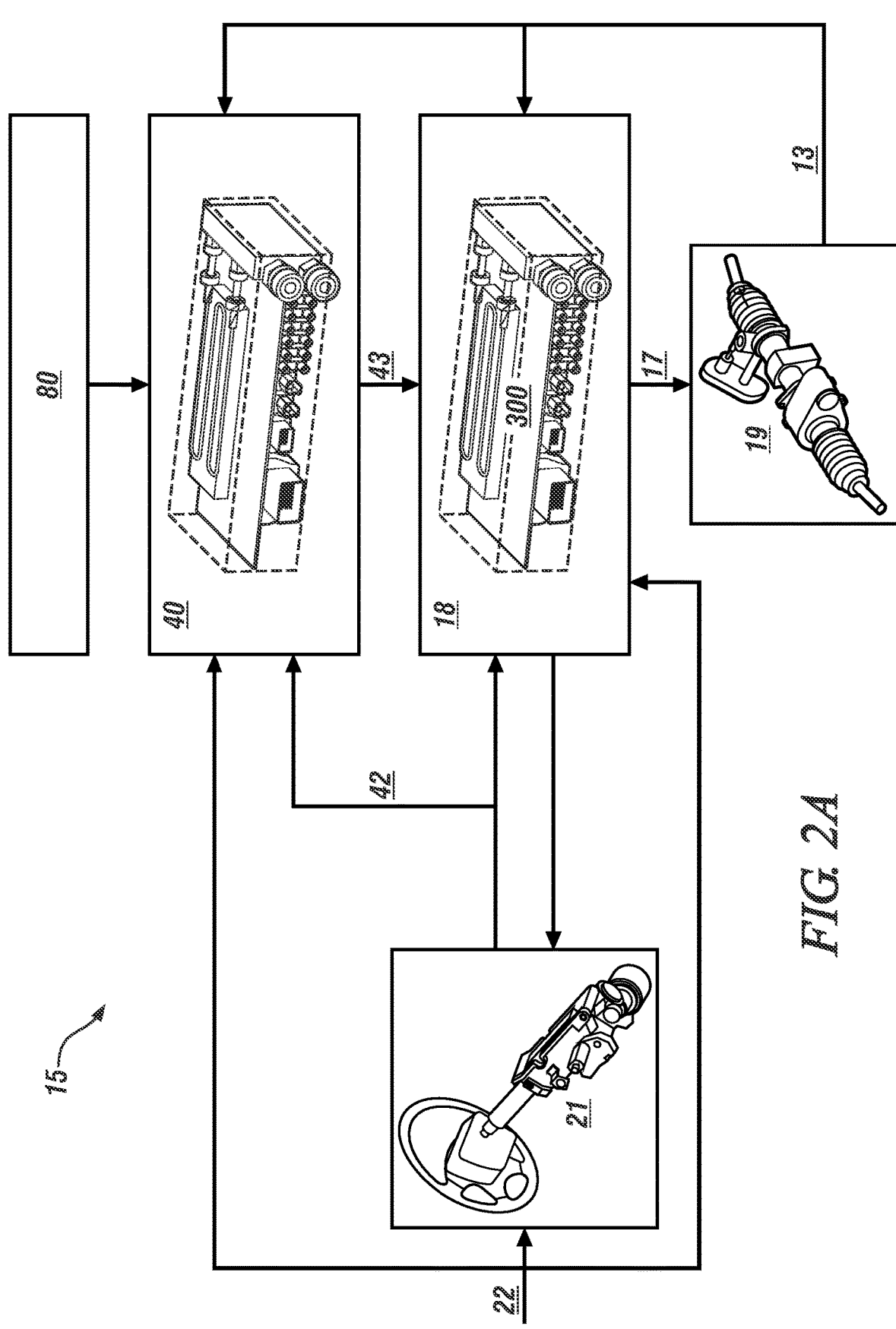
FIG. 2A schematically illustrates elements of an advanced driver assistance system (ADAS) and a steer-by-wire steering system employable on a vehicle, in accordance with the disclosure.
Figure 2B:
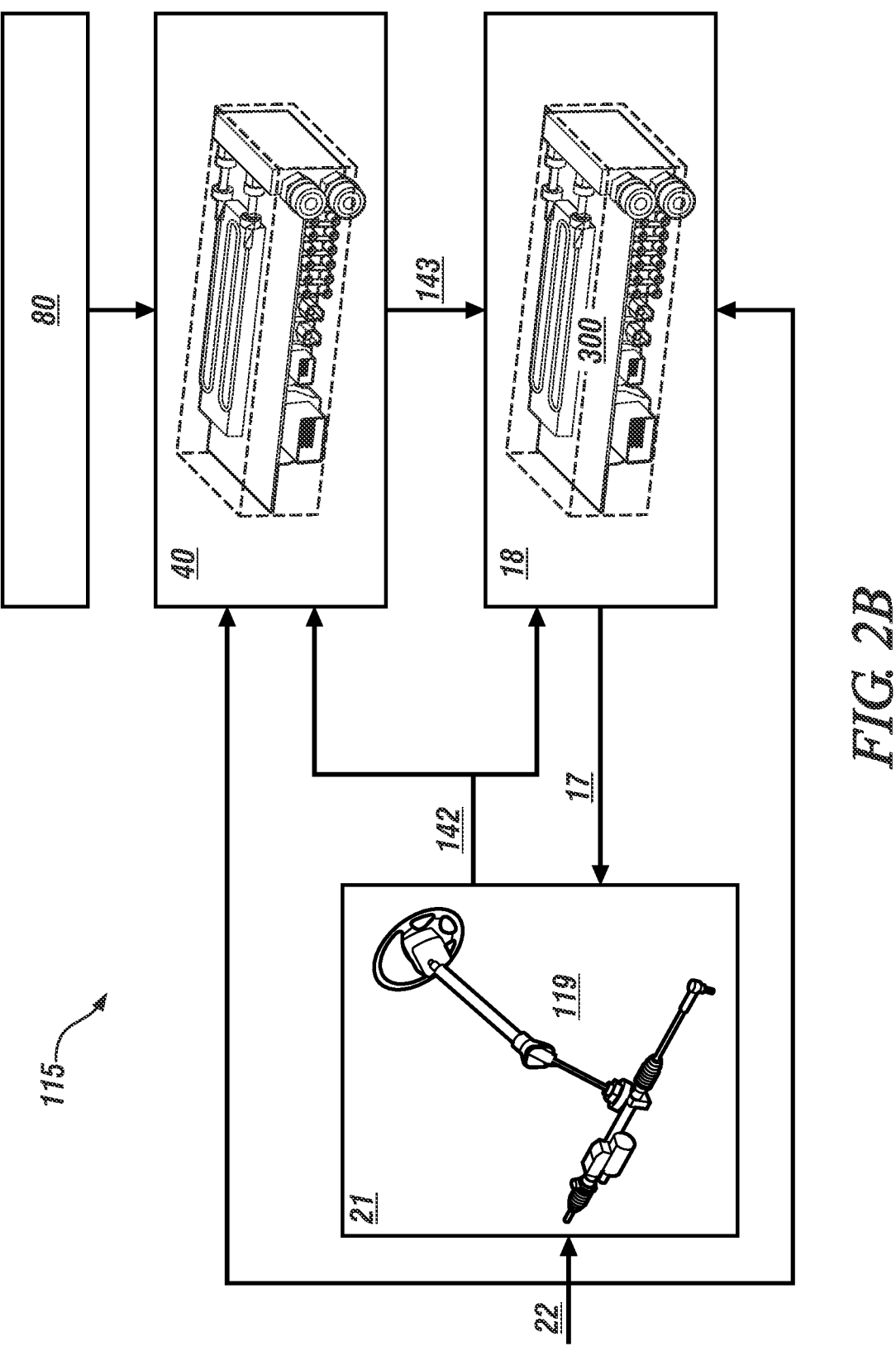
FIG. 2B schematically illustrates elements of an advanced driver assistance system (ADAS) and a rack-and-pinion steering system employable on a vehicle, in accordance with the disclosure.

Referring to the drawings, wherein like reference numerals correspond to like or similar components throughout the several Figures, FIGS. 1, 2A, and 2B, consistent with embodiments disclosed herein, illustrate elements of a vehicle 100 having a steering wheel 21, an advanced driver assistance system (ADAS) 40 and an embodiment of a steering system, which may be a steer-by-wire steering system 15 (FIG. 2A) or a rack-and-pinion steering system 115 (FIG. 2B), wherein the steering system 15, 115 includes a collaborative steering subsystem 300. Details related to the collaborative steering subsystem 300 are described with reference to FIGS. 3, et seq.

The vehicle 100 may include, but not be limited to a mobile platform in the form of a commercial vehicle, industrial vehicle, agricultural vehicle, passenger vehicle, aircraft, watercraft, train, all-terrain vehicle, personal movement apparatus, robot, and the like to accomplish the purposes of this disclosure. Furthermore, embodiments of the vehicle 100 may include vehicles employing wheels, tracks, propellers and rudders, etc., to effect traction, braking, and steering functions.

The term "steering wheel" is employed to describe a device that is employed by a driver or operator to input or command an intended direction of travel for the vehicle 100. It is to be appreciated that the steering wheel may be replaced by a joystick, a tiller, a steering clutch, or another device within the scope of the disclosure.

Referring again to FIG. 1, the vehicle 100 is disposed on and able to traverse a travel surface such as a paved road surface. The vehicle 100 includes, in one embodiment, a vehicle operating system 10, passenger cabin, spatial monitoring system 30, ADAS 40, navigation system 50, human/machine interface (HMI) 60, telematics system 70, and vehicle monitoring system 80.

The vehicle operating system 10 is composed of a propulsion system 11, a braking system 12, a suspension system 14, and a steering system in the form of a steer-by-wire steering system 15 (FIG. 2A) or a rack-and-pinion steering system 115 (FIG. 2B) and a steering wheel 21. Operations of the various elements of the vehicle operating system 10 are controlled by one or multiple controllers in response to operator inputs to operator controls 25 including the steering wheel 21.

The steering system 15, 115 includes a steering controller 18 and a steering actuator 19. The steering actuator 19 is coupled to one or multiple steerable wheels 16 of the vehicle 100. The steering actuator 19 is controlled by the steering controller 18, and is monitored by one or multiple sensors that generate steering system parameters 13 that correspond to road wheel angle, etc. The steering controller 18 executes control elements of the collaborative steering subsystem 300, which includes a steering control routine 350 having a model predictive controller (MPC) 400 (described with reference to FIG. 3, et seq.). The collaborative steering subsystem 300 employs operator input to steering wheel 21 to determine a driver steering command 322. The driver steering command 322 in collaboration with a second steering command 342 from the ADAS 40 are input to a steering control routine 350 with model predictive controller (MPC) 400 to determine a steering angle command 17 for controlling the steering actuator 19 and thus control the steerable wheel(s) 16 to a desired road wheel angle.

The passenger cabin includes steering wheel 21, a plurality of operator controls, and one or a plurality of communication devices including a visual display system associated with HMI system 60. The operator controls may include, by way of non-limiting examples, an accelerator pedal, a brake pedal, a turn signal indicator, a suspension selection switch, a transmission range selector (PRNDL), a cruise control actuator, an ADAS actuator, a parking brake, and/or other operator-controlled devices in addition to the steering wheel 21.

The plurality of communication devices 26 may include an audio system with at least one speaker and at least one microphone, one or a plurality of haptic devices disposed in a driver seat bottom and/or a seat back, and a multicolor illumination bar disposed on the steering wheel 21. The visual display system 24 may be arranged as an electronic visual display device, e.g., a touchscreen that is capable of electronic presentation of still images, text, and/or video in black-and-white and/or color formats. The visual display system 24 includes one or more of a driver information center display screen, a heads-up display, vehicle interior lighting, left and right sideview mirrors, a rear-view mirror, etc. In one embodiment, the visual display system 24 is an electronic visual display module, e.g., a liquid crystal display (LCD) device having touch-screen capability.

The spatial monitoring system 30 includes, in one embodiment, one or a plurality of spatial sensors and systems that are arranged to monitor a viewable region that is peripheral to and proximal to the vehicle 100, including forward, rearward, leftward, and rightward of the vehicle 100, and a spatial monitoring controller. The spatial sensors may include, e.g., a video camera, a LiDAR sensor, a radar sensor, an ultrasound sensor, and/or another device, and are disposed on-vehicle to monitor at least a portion of the viewable region to detect proximate remote objects such as road features, lane markers, buildings, pedestrians, road signs, traffic control lights and signs, other vehicles, and geographic features that are proximal to the vehicle 100. The spatial sensors may also include a video camera and/or another device that is disposed in-cabin to monitor the driver.

The navigation system 50 may include on-board and/or off-board maps and a global positioning system (GPS) sensor 83. The navigation system 50 provides vehicle location information, travel route information, and point-to-point travel route execution information to a vehicle operator and to the ADAS 40.

The HMI system 60 includes touchscreen(s), audio devices, haptic devices, and controller(s) that facilitate(s) communication, interaction, and control of the ADAS 40, the spatial monitoring system 30, the navigation system 50, and the telematics system 70. The HMI system 60 enables a vehicle operator to interact with and direct operation of the vehicle 100 in functioning to provide passenger communication, navigation, infotainment, environmental comfort, etc., and to gain access to recessed areas on-vehicle. Operator interface devices may include devices that are capable of transmitting a message.

The ADAS system 40 is configured to implement autonomous driving or advanced driver assistance system (ADAS) vehicle functionalities, employing inputs from the navigation system 50, the spatial monitoring system 30, the various elements of the vehicle operating system 10, and the HMI system 60. Such functionality may include an on-vehicle control system that is capable of providing a level of driving automation. The terms 'driver' and 'operator' describe the person responsible for directing operation of the vehicle 100, whether actively involved in controlling one or more vehicle functions or directing autonomous vehicle operation.

Driving automation may include a range of dynamic driving and vehicle operations. Driving automation may include some level of automatic control or intervention related to a single vehicle function, such as steering, acceleration, and/or braking, with the driver continuously having overall control of the vehicle 100. Driving automation may include some level of automatic control or intervention related to simultaneous control of multiple vehicle functions, such as steering, acceleration, and/or braking, with the driver continuously having overall control of the vehicle 100. Driving automation may include simultaneous automatic control of vehicle driving functions that include steering, acceleration, and braking (via steering system 15, propulsion system 11, and braking system 12, respectively) wherein the driver cedes control one or more of the vehicle driving functions of the vehicle 100 for a period of time during a trip. Autonomous vehicle functions may include, by way of non-limiting examples, an adaptive cruise control (ACC) operation, lane guidance and lane keeping operation, lane change operation, steering assist operation, object avoidance operation, parking assistance operation, vehicle braking operation, collision avoidance operation, vehicle speed and acceleration operation, vehicle lateral motion operation, etc.

The telematics system 70 includes a wireless telematics communication system capable of extra-vehicle communication, including communicating with a communication network 90 having wireless and wired communication capabilities. The extra-vehicle communications may include short-range vehicle-to-vehicle (V2V) communication and/or vehicle-to-everything (V2x) communication, which may include communication with an infrastructure monitor, e.g., a traffic camera. Alternatively, or in addition, the telematics system 70 may include wireless telematics communication systems that are capable of short-range wireless communication to a handheld device 72, e.g., a cell phone, a satellite phone or another telephonic device. In one embodiment the handheld device 72 includes a software application that includes a wireless protocol to communicate with the telematics system 70, and the handheld device 72 executes the extra-vehicle communication, including communicating with an off-board server via the wireless communication network. Alternatively, or in addition, the telematics system 70 may execute the extra-vehicle communication directly by communicating with the remote facility 95 via the communication network 90.

The vehicle monitoring system 80 includes a plurality of sensors and calibrated routines that are arranged to monitor a plurality of operating parameters 82 of the vehicle operating system 10, including, e.g., vehicle speed, acceleration, braking, yaw rate, roll, pitch, etc. In one embodiment, the vehicle monitoring system 80 includes a global positioning system (GPS) sensor 83 that is employed by the navigation system 50.

In one embodiment, the vehicle monitoring system 80 includes an inertial measurement unit (IMU) 84. The IMU 84 is an electronic device that employs one or more of a combination of accelerometers, gyroscopes, and magnetometers that are arranged to measure and report vehicle dynamics parameters such as specific force, angular rate, yaw, and orientation of the vehicle 100.

The communication network 90 may include one or more of cellular communication 91, satellite communication 92, and cloud-based communication 93, which are configured to effect communication with a remote facility 95.

The steering system 15, 115 includes steering actuator 19 that couples to one or multiple steerable wheels 16 of the vehicle 100, with the steering actuator 19 being controlled by operator input to a steering wheel 21 in collaboration with a steering controller 18. The steering controller 18 executes control elements of the collaborative steering subsystem 300, which employs operator input to steering wheel 21 in collaboration with ADAS 40 to determine the steering angle command 17 for controlling the steering actuator 19 and thus control the steerable wheel(s) 16 to a desired road wheel angle. Further details are described with reference to FIGS. 2A and 2B.

Referring now to FIG. 2A, with continued reference to the elements of FIG. 1, an embodiment of elements of the steer-by-wire steering system 15 are illustrated, including signal communication paths therebetween. The steer-by-wire steering system 15 includes steering wheel 21 and steering actuator 19, which couples to the steerable wheel(s) 16 of the vehicle 100. The steering wheel 21 generates a first steering command 42 that is communicated to the steering controller 18. In one embodiment, the steering actuator 19 is an electric power steering device that is arranged as a steer-by-wire system. The plurality of vehicle sensors of the vehicle monitoring system 80 provide inputs to the ADAS 40, which generates a second steering command 43 that is communicated to the steering controller 18. The steering controller 18 executes elements of collaborative steering subsystem 300 to generate the steering angle command 17 that is employed to control the steering actuator 19 to control a steering angle of the steerable wheel(s) 16, and thus control the direction of travel of the vehicle 100.

Referring now to FIG. 2B, with continued reference to the elements of FIG. 1, another embodiment of elements of rack-and-pinion steering system 115 are illustrated, including signal communication paths therebetween. The rack-and-pinion steering system 115 includes steering wheel 21 and steering actuator 119, which couples to the steerable wheel(s) 16 of the vehicle 100. The driver steering command 22 is input to the steering actuator 119, which generates first steering command 142 is communicated to the steering controller 18 and the ADAS 40. In one embodiment, the steering actuator 119 is in the form of a controllable rack and pinion steering system. The plurality of vehicle sensors of the vehicle monitoring system 80 provide inputs to the ADAS 40, which generates a second steering command 143 that is communicated to the steering controller 18. The steering controller 18 includes the collaborative steering subsystem 300, which generates the steering angle command 17 based upon the first steering command 142 and the driver steering command 22 (when present), which is employed to control the steering actuator 119 to control a steering angle of the steerable wheel(s) 16, and thus control the direction of travel of the vehicle 100 in response thereto.

The term "controller" and related terms such as microcontroller, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component stores machine readable instructions in the form of one or more software or firmware programs or routines, combinational logic circuit(s), input/output circuit(s) and devices, signal conditioning and buffer circuitry and other components that may be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event.

Communication between controllers, actuators and/or sensors may be accomplished using a direct wired point-to-point link, a networked communication bus link, a wireless link, or another suitable communication link, including, e.g., an Ethernet link and a controller area network (CAN) link. Communication includes exchanging data signals in suitable form, including, for example, electrical signals via a conductive medium, electromagnetic signals via air, optical signals via optical waveguides, and the like. The data signals may include discrete, analog, or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, which is capable of traveling through a medium. A parameter is defined as a measurable quantity that represents a physical property of a device or other element that is discernible using one or more sensors and/or a physical model. A parameter may have a discrete value, e.g., either "1" or "0", or may be infinitely variable in value.

Figure 3:
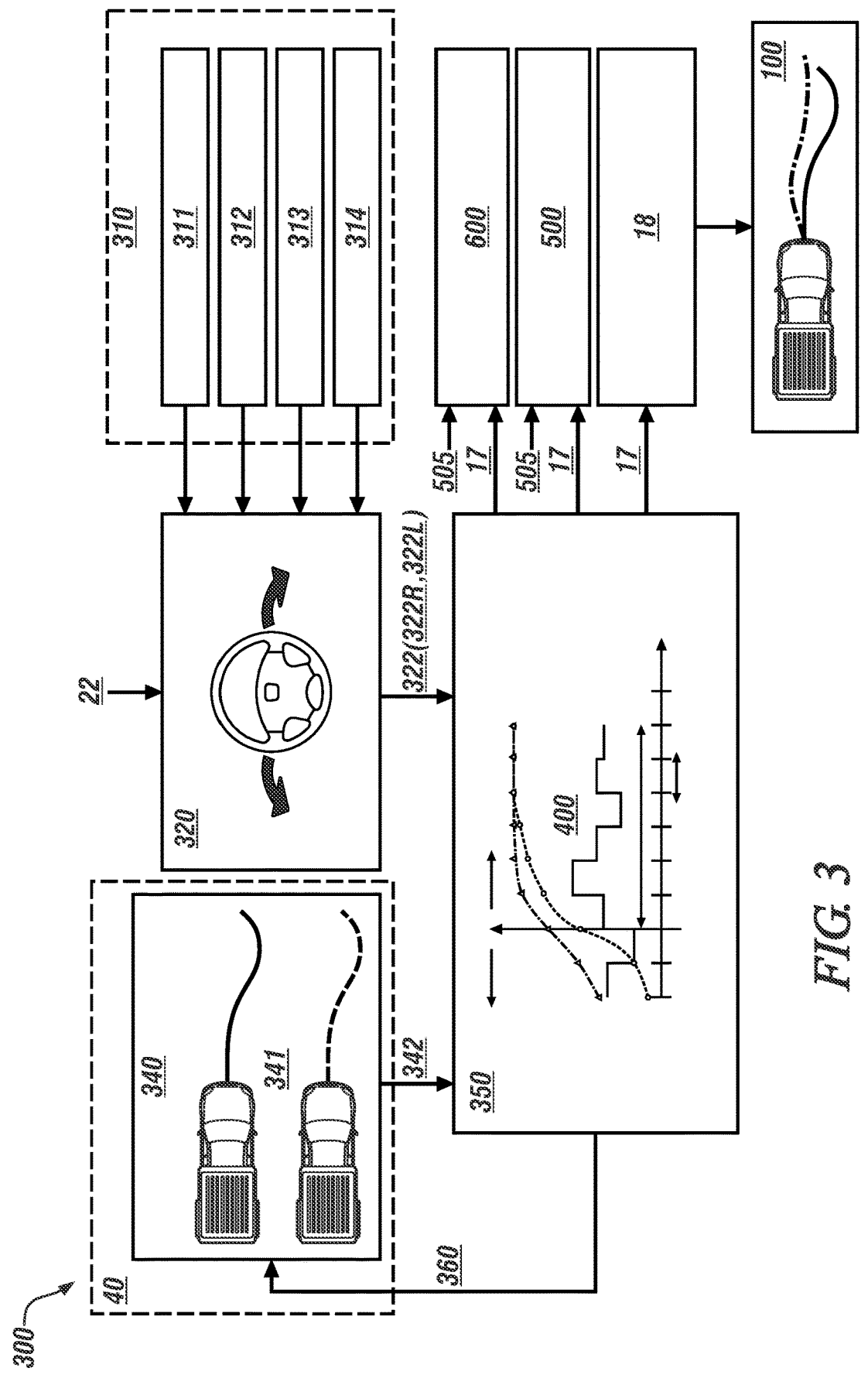
FIG. 3 schematically illustrates elements of a steering system that is employable on a vehicle, in accordance with the disclosure.

FIG. 3, described in context of an embodiment of the vehicle 100 of FIG. 1 and steering systems of FIGS. 2A and/or 2B, schematically illustrates elements of the collaborative steering subsystem 300. The collaborative steering subsystem 300 employs operator input to the steering wheel 21 in collaboration with the ADAS 40 to determine the steering angle command 17 for controlling the steering actuator 19 and thus achieving a steering angle for the steerable wheel(s) 16 to control a direction of travel of the vehicle 100.

The collaborative steering subsystem 300 operates to determine a weighted driver steering command 322 in collaboration the second steering command 342 from the ADAS 40, which are employed to determine a steering angle command 17 for controlling the steering actuator 19 and thus control the steerable wheel(s) 16.

Stated another way, the collaborative steering subsystem 300 for vehicle 100 includes a driver-controllable steering device, e.g., steering wheel 21 from which a driver steering command 22 is determined; steering actuator 19, which is coupled to steerable wheel 16 of vehicle 100; ADAS 40 including spatial monitoring system 30 and navigation system 50; and steering controller 18. The steering controller 18 is in communication with the steering wheel 21, the steering actuator 19, and the ADAS 40. The steering controller 18 has the collaborative steering subsystem 300, which includes the steering control routine 350 with model predictive controller (MPC) 400. The collaborative steering subsystem 300 is executable to determine, via the ADAS 40, a target path and a target trajectory 341 for the vehicle 100 based upon one or multiple inputs from the spatial monitoring system 30, as well as inputs from the navigation system 50, and in some instances and/or embodiments, inputs from extra-vehicle communications via the telematics system 70. The target path and target trajectory are employed to determine a second steering command 342. The steering control routine 350 determines, via the steering wheel 21, the driver steering command 22; determines, via the spatial monitoring system 30, a plurality of external factors related to the target path and the target trajectory 341; determines one (or first, leftward and second, rightward) weighted driver steering commands 322 (322L, 322R) based upon the plurality of external factors and the driver steering command 22; determines a second steering command 342 based upon the target path and trajectory 341; and determines the steering angle command 17 based upon the driver steering command 22, the weighted driver steering command(s) 322 (322L, 322R), and the second steering command 342 that is derived from the target path and the target trajectory 341. The steering control routine 350 commands the steering controller 18 to control the steering actuator 19 to control the steerable wheel 16 of the vehicle 100 responsive to the steering angle command 17.

The steering control routine 350 also determines a driver requested offset (DRO) 360, which is input to the ADAS 40. The DRO 360 includes a DRO onset signal that is communicated to the ADAS 40 that requests a change or adaptation to the vehicle trajectory in response to a driver's command, i.e., the driver steering command 22. The DRO 360 is governed by the following relationship:

$$DRO_{Set} = \text{TRUE if } \text{var}(|u_{Driver} - u_{ref}|) < k_{DRO} \text{ for } t > t_{DRO_{set}} \qquad [1]$$

wherein:

$DRO_{Set}$ represents a driver requested offset onset signal to planner to adapt trajectory to driver's command;

$DRO_{Reset}$ represents a driver requested offset reset signal to planner;

$u_{ref}$ represents a road wheel angle required to track reference trajectory from planner;

$\text{var}(|u_{Driver} - u_{ref}|)$ represents a variance of the difference between estimated driver's desired road wheel angle and road wheel angle required to track reference trajectory from planner;

$k_{DRO}$ represents a variance threshold for setting driver requested offset signal;

$t_{DRO_{Set}}$ represents a minimum time threshold for setting driver requested offset signal; and $t_{DRO_{Reset}}$ represents a minimum time threshold for resetting driver requested offset signal.

The relationship of EQ. 1 is employed to communicate a signal to path planning routine 340 to modify the trajectory of the vehicle.

The relationship of EQ. 2 (below) defines the DRO 360, which may be employed in ADAS functions to adapt the steering angle command 17 in response to the driver steering command during functions such as lane keeping, lane centering, route following, and obstacle avoidance operations.

In this manner, the steering control routine 350 is able to modify, i.e., reduce the control authority of the ADAS 40 to allow the driver to have greater steering authority in one of or both of the first and second steering directions via the weighted driver steering command 322. Alternatively, or in addition, the steering control routine 350 is able to modify, i.e., increase the control authority of the ADAS 40 to reduce the steering authority of the driver in one of or both of the first and second steering directions via the weighted driver steering command 322.

The collaborative steering subsystem 300 generates, in one embodiment, the steering angle command 17, which is input to a driver steering alert routine 500 for analysis to determine a need to generate a driver alert that may be communicated to the driver via elements of the HMI 60. A non-limiting embodiment of the driver steering alert routine 500 is described with reference to FIG. 5.

The collaborative steering subsystem 300 generates, in one embodiment, a steering feel command 612, which is input to a steering emulator routine 600 for controlling the driver-controllable steering device, e.g., steering wheel 21. A non-limiting embodiment of the steering emulator routine 600 is described with reference to FIG. 6.

Referring again to FIG. 3, the collaborative steering subsystem 300 includes a driver command routine 320 and a path planning routine 340, which provide the weighted driver steering commands 322 (322L, 322R) and the second steering command 342 to the steering control routine 350. The steering control routine 350 employs a model predictive controller (MPC) 400 to generate the steering angle command 17, command the driver steering alert routine 500, and execute a steering emulator routine 600 to control the collaborative steering subsystem 300.

The path planning routine 340 is executed in the ADAS 40, which determines the target path and target trajectory 341 for the vehicle 100, employing inputs from the navigation system 50, the spatial monitoring system 30, the vehicle monitoring system 80, and the telematics system 70. The path planning routine 340 generates the second steering command 342 based upon the target path and target trajectory 341, taking into account constraints that may be dictated by the adaptive cruise control (ACC) operation, lane guidance and lane keeping operation, lane change operation, steering assist operation, object avoidance operation, parking assistance operation, vehicle braking operation, collision avoidance operation, vehicle speed and acceleration operation, vehicle lateral motion operation, etc.

The driver command routine 320 determines the first steering command 322 based upon the driver steering command 22 that includes a driver input to the steering wheel 21 (or absence thereof), which may be adjusted to account for a plurality of external factors 310. The plurality of external factors 310 includes activation (or deactivation) of an active driver assist mode 311, a plurality of environmental factors 312, a driver preference selection 313, and one or a plurality of vehicle control factors 314. The driver command routine 320 executes a weighting algorithm to determine a weighted driver steering command 322.

The driver command routine 320 operates in accordance with the following relationship:

$$u_{driver} = \frac{1}{K_p} T_{driver} + \left(1 - \frac{K_a}{K_p}\right) u_{actual} \quad [2]$$

$$k_{db} = \begin{cases} \min(1, \alpha_{ramp} * (u_{Driver} - u_{db})) & \text{if } u_{Driver} > u_{db} \\ 0 & \text{otherwise} \end{cases}$$

$$V_{Driver} = \frac{1}{2} (u_{Driver} - u_{k=1})^2 W_D$$

and $$W_D = k_{db} * k_D$$

wherein:

$u_{Driver}$ represents estimated driver's desired road wheel angle, i.e., driver steering command;

$u_{actual}$ represents actual road wheel angle;

$u_{k=1}$ represents MPC road wheel angle command for the first control horizon point;

$W_D$ represents penalty weight for deviation between driver's command and MPC command;

$K_p$ represents steering torque gain;

$K_a$ represents alignment torque gain;

$T_{driver}$ represents the driver torque command, i.e., the driver steering command 22;

$k_{db}$ represents driver steering command deadband gain factor; and $k_D$ represents driver steering command gain factor, influenced by the plurality of external factors.

The plurality of external factors 310 includes as follows.

The selection of the active driver assist mode 311 (or absence thereof) includes an indication of a driver selection of one or more of the autonomous vehicle functions via the ADAS 40. The autonomous vehicle functions may include, by way of non-limiting examples, an adaptive cruise control (ACC) operation, lane guidance and lane keeping operation, lane change operation, steering assist operation, object avoidance operation, parking assistance operation, vehicle braking operation, collision avoidance operation, vehicle speed and acceleration operation, vehicle lateral motion operation, e.g., as part of the lane guidance, lane keeping and lane change operations, traffic signal detection and recognition, blind spot monitoring, pedestrian detection, etc.

The environmental factors 312 include, by way of non-limiting examples, distance(s) to perceived side threat(s) to the left and/or right of the vehicle 100, distance(s) to perceived obstacle(s) in the target path and the target trajectory 341 of the vehicle 100, vehicle traffic conditions, roadway configuration, surface conditions (rain, ice, snow, other), presence of a towed trailer, etc.

The driver preference selection 313 includes, by way of non-limiting examples: selection of one of a sport mode, an economy mode, or an off-road mode; and selection of two-wheel drive, four-wheel drive, or all-wheel drive.

The vehicle control factors 314 include, by way of non-limiting examples, vehicle position and trajectory errors in tracking the target path and the target trajectory 341.

The weighted driver steering command 322 is determined based upon the driver steering command 22 that has been adjusted by the driver command routine 320 including accounting for the plurality of external factors 310. This may include determination of a leftward driver steering command 322L and a rightward driver steering command 322R, which are based upon the environmental factors including, e.g., a perceived side threat(s) to the right and left sides of the vehicle 100, respectively. As such, the plurality of external factors 310 may be employed to determine a first weighting function associated with a first steering direction, e.g., leftward driver steering command 322L and a second weighting function associated with a second steering direction that is opposite to the first steering direction, e.g., rightward driver steering command 322R.

The second steering command 342 for the vehicle 100 and the weighted driver steering command(s) 322 are provided as inputs to the MPC 400, which is executed to determine a steering angle command 17 and a driver alert signal 117. The steering angle command 17 is communicated to the steering controller 18, which controls the steering actuator 19 coupled to steerable wheels 16 of the vehicle 100 based thereon. This may include communicating to the driver a need to actively steer the vehicle 100 via the steering wheel 21.

Figure 4:
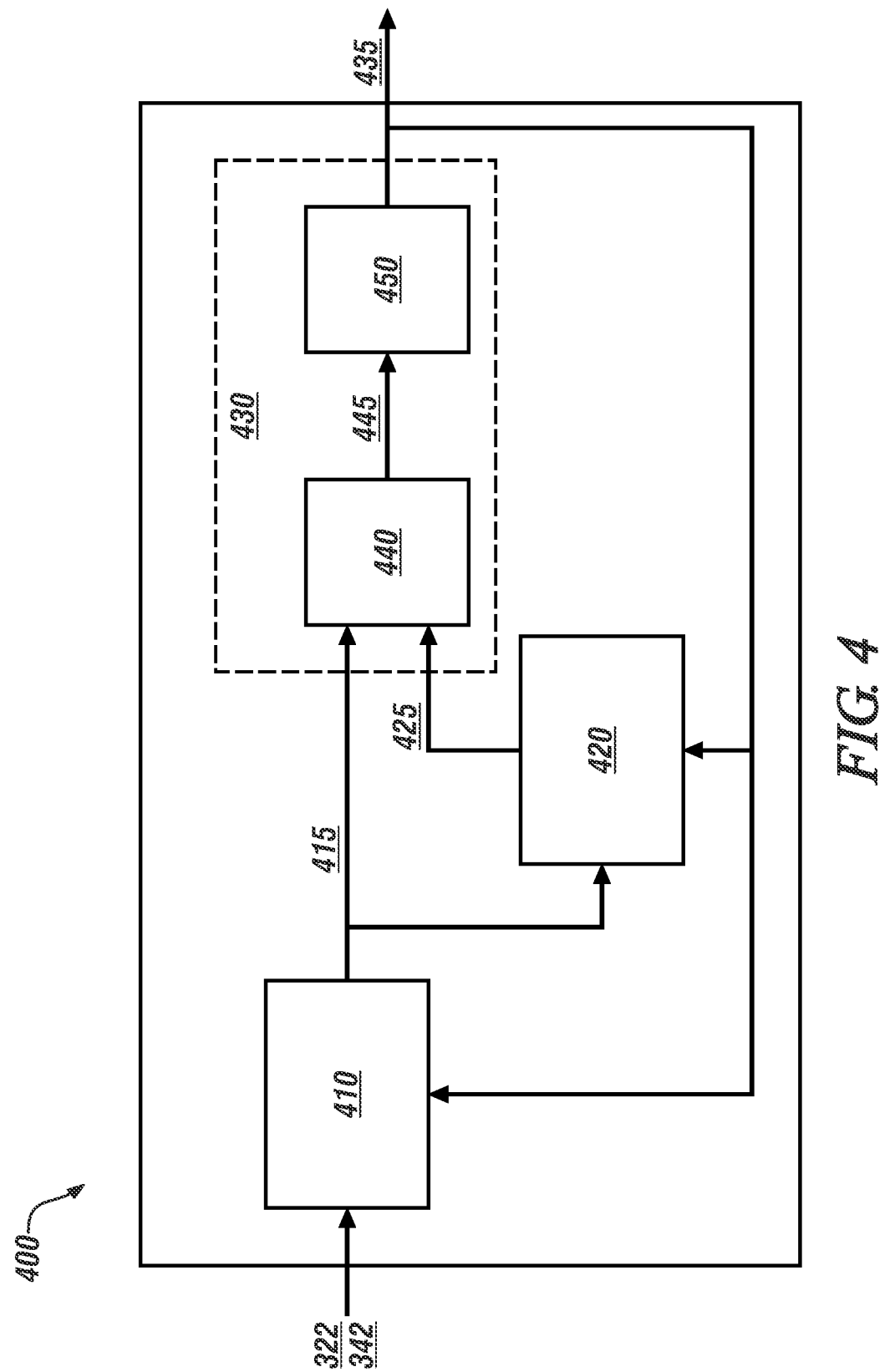
FIG. 4 schematically illustrates elements of a Model Predictive Controller (MPC) for a steering system that is employable on a vehicle, in accordance with the disclosure.

FIG. 4 schematically illustrates elements of the MPC 400, which includes a prediction model of the entire steering system, as controlled by both the driver and the MPC command, for employment by the MPC 400 in determination of its optimal control command. This includes a feedback regime to account for a collaborative effect to achieve the steering angle command 17, using the weighted driver steering command 322 and the second steering command 342 as inputs.

The MPC 400 is an optimal control technique in which the calculated control actions minimize a cost function (V, EQ. 3) for a constrained dynamic system, i.e., the vehicle 100, over a finite, receding, horizon. The MPC 400 employs a process model to predict future behaviors and optimize control parameters, e.g., the steering angle command 17, to achieve the best performance. As described herein, the cost function V relates to the performance measure that is to be minimized or optimized, e.g., the steering angle command 17, when applied to the collaborative steering subsystem 300. As such, a prediction model of the entire steering system, as controlled by both the driver and the MPC command, is provided for employment by the MPC 400 in determination of an optimal control command.

The elements of the MPC 400 include inputs, constraints, and outputs. The inputs preferably include a reference trajectory, a driver steering input, and system feedback. The reference trajectory may be in the form of the target path and the target trajectory 341, which is determined employing the navigation system 50 and the ADAS 40, with inputs from the plurality of vehicle sensors of the vehicle monitoring system 80. The driver steering input is in the form of the weighted driver steering command 322. The system feedback includes parameters related to a current state of the vehicle 100, including actual steering angle, wheel speeds, inertial measurements, etc. Examples of the constraints include steering angle limits, friction, obstacle detection, side threats, etc.

The MPC 400 uses the system model to simulate and optimize control signals within the constraints to operate the vehicle 100 to follow the target path and the target trajectory 341.

Elements of the MPC 400 include a driver steering angle command estimator 410, a lateral controller 420, a steering angle dynamics routine 430, a modelled weighting of the MPC and driver influence on the overall steering command 440, and a modelled dynamic response of the steering actuator 450. The driver steering angle command estimator 410 estimates a driver steering angle 415 based upon a driver steering torque 405 and feedback of an estimated steering angle 455 that is output from the steering angle dynamics routine 430. The lateral controller 420 includes a dynamic model of the steering system 15, which is executable to estimate an MPC steering angle 425 based upon the driver steering angle 415 and the estimated steering angle 455. The driver steering angle 415 and the MPC steering angle 425 are input to the steering angle dynamics routine 430. The modelled weighting of the MPC and driver influence on the overall steering command 440 imposes weighting factors to determine a modelled overall steering command from collaboration of the driver and MPC 445, which is input to the modelled dynamic response of the steering actuator 450, which may be in the form of a transfer function, to determine the estimated steering angle 455.

The MPC 400 operates in accordance with the following relationships:

$$V = \frac{1}{2}\sum_{k=1}^{p}\left\{(y - y_{ref})^2 W_y + (u - u_{ref})^2 W_u + (u_k - u_{k-1})^2 W_{\Delta u} + \epsilon^2 \ W_\epsilon\right\} + \tag{3}$$

$$\frac{1}{2}(u_{Driver} - u_{k=1})^2 W_D$$

and $$x_{k+1} = A_d x_k + B_d u_k + B_d u_{driver,k}$$

wherein:

V represents an MPC cost function, y represents vehicle trajectory;

yref represents a reference trajectory;

$u_{Driver}$ represents estimated driver's desired road wheel angle;

$u_{actual}$ represents actual road wheel angle;

$u_{k=1}$ represents MPC road wheel angle command for the first control horizon point;

$W_D$ represents penalty weight for deviation between driver's command and MPC command;

$W_y$ represents a penalty weight for deviation between a predicted trajectory and a reference trajectory;

$W_u$ represents a penalty weight for deviation between a predicted road wheel angle and a reference road wheel angle;

$W_\Delta$ represents a penalty weight for increments between road wheel angle commands; and $W_\epsilon$ represents a penalty weight for slack variables.

The driver steering angle command estimator 410 may be determined in accordance with the following relationship:

$$T_{driver} = K_p(\delta_{driver} - \delta_{actual}) + K_a\delta_{actual} \tag{4}$$

$$\hat{\delta}_{driver} = \frac{1}{K_p}T_{driver} + \left(1 - \frac{K_a}{K_p}\right)\delta_{actual} \tag{5}$$

The lateral controller 420 may be determined in accordance with the following relationship:

The steering angle dynamics routine 430 may be determined in accordance with the following relationship:

$$\hat{\delta}_{cmnd} = \frac{w_{driver}\hat{\delta}_{driver} + w_{MPC}\delta_{MPC}}{\sum w_i} \tag{6}$$

and $$\dot{\delta}_{actual} = \frac{\hat{\delta}_{cm\ nd} - \delta_{actual}}{\tau} = \frac{w_{driver}}{\sum w_i\tau}\hat{\delta}_{driver} + \frac{w_{MPC}}{\sum w_i\tau}\delta_{MPC} - \frac{\delta_{actual}}{\tau} = \tag{7}$$

$$\frac{w_{driver}}{\sum w_i\tau}\left(\frac{1}{K_p}T_{driver}\right) + \frac{1}{\tau}\left(\frac{w_{driver}}{\sum w_i}\left(1 - \frac{K_a}{K_p}\right) - 1\right)\delta_{actual} + \frac{w_{MPC}}{\sum w_i\tau}\delta_{MPC}$$

wherein:

$\hat{\delta}_{driver}$ represents an estimated driver's desired road wheel angle;

$\delta_{actual}$ represents an actual road wheel angle;

$K_p$ represents a steering torque gain;

$K_a$ represents an alignment torque gain;

$\hat{\delta}_{cmnd}$ represents an approximated total road wheel angle command;

$\delta_{MPC}$ represents an MPC road wheel angle command;

$W_{driver}$ represents a driver command weight;

$W_{MPC}$ represents an MPC command weight;

$\dot{\delta}_{actual}$ represents a rate of change of road wheel angle;

$\tau$ represents a time constant; and $T_{driver}$ represents the driver torque command, i.e., the driver steering command 22.

The foregoing relationships described with reference to EQS. 6 and 7 may be resolved employing linear equations to optimize the cost function, and thus improve the predictability of the approximated total road wheel angle command based upon the collaborative effort to achieve the steering angle command 17, using the weighted driver steering command 322 and the second steering command 342 as inputs.

For a vehicle steering application, the MPC 400 can use a dynamic model of the steering system 15 along with the target path and the target trajectory 341. Real-time feedback of steering angle and vehicle positions are fed to the MPC 400. The MPC 400 calculates the steering angle command 17 to steer the vehicle 100 along the target path and the target trajectory 341, accounting for constraints that may be related to vehicle dynamics and other factors.

The utilization of the MPC 400 for vehicle steering enables anticipation of future deviations off the trajectory, facilitating early, optimized corrective action, including steering control inputs that take into consideration vehicle dynamics, the desired trajectory, driver inputs and system constraints, left/right weighting factors, driver preferences, presence of obstacles in the travel path, etc. Furthermore, the ADAS 40 may provide an enhanced reference trajectory for the MPC 400 using the plurality of vehicle sensors of the vehicle monitoring system 80, cameras, radar, LiDAR, etc., of the spatial monitoring system 30, high-definition maps that are employed by the navigation system 50, and V2X communication via the telematics system 70. The ADAS 40 may also set other constraints based on road conditions and speed limits.

The estimated steering angle 455 is output by the steering control routine 350 to minimize trajectory error and achieve path tracking for the vehicle 100. It may be employed to override or augment driver inputs that may otherwise inadvertently send the vehicle 100 off the desired path, and/or avoid a collision on the desired path. This enables functions like lane centering and crash avoidance.

In operation, at each time step, the collaborative steering subsystem 300 receives or estimates the current state of the vehicle 100. The MPC 400 calculates the sequence of control actions that minimizes the cost over the horizon by solving a constrained optimization problem that relies on an internal plant model and depends on the current state. The collaborative steering subsystem 300 applies to the steering system 15 the first computed control action and disregards the following ones. The process repeats in each subsequent time step.

Referring again to FIG. 3, the estimated steering angle (shown as element 455 in FIG. 4) is output by the steering control routine 350 as the steering angle command 17, which is communicated to the steering controller 18 for controlling the steering actuator 19 coupled to steerable wheels 16 of the vehicle 100 in response.

The steering control routine 350 also generates the driver alert signal 117, which is input to driver steering alert routine 500.

Figure 5:
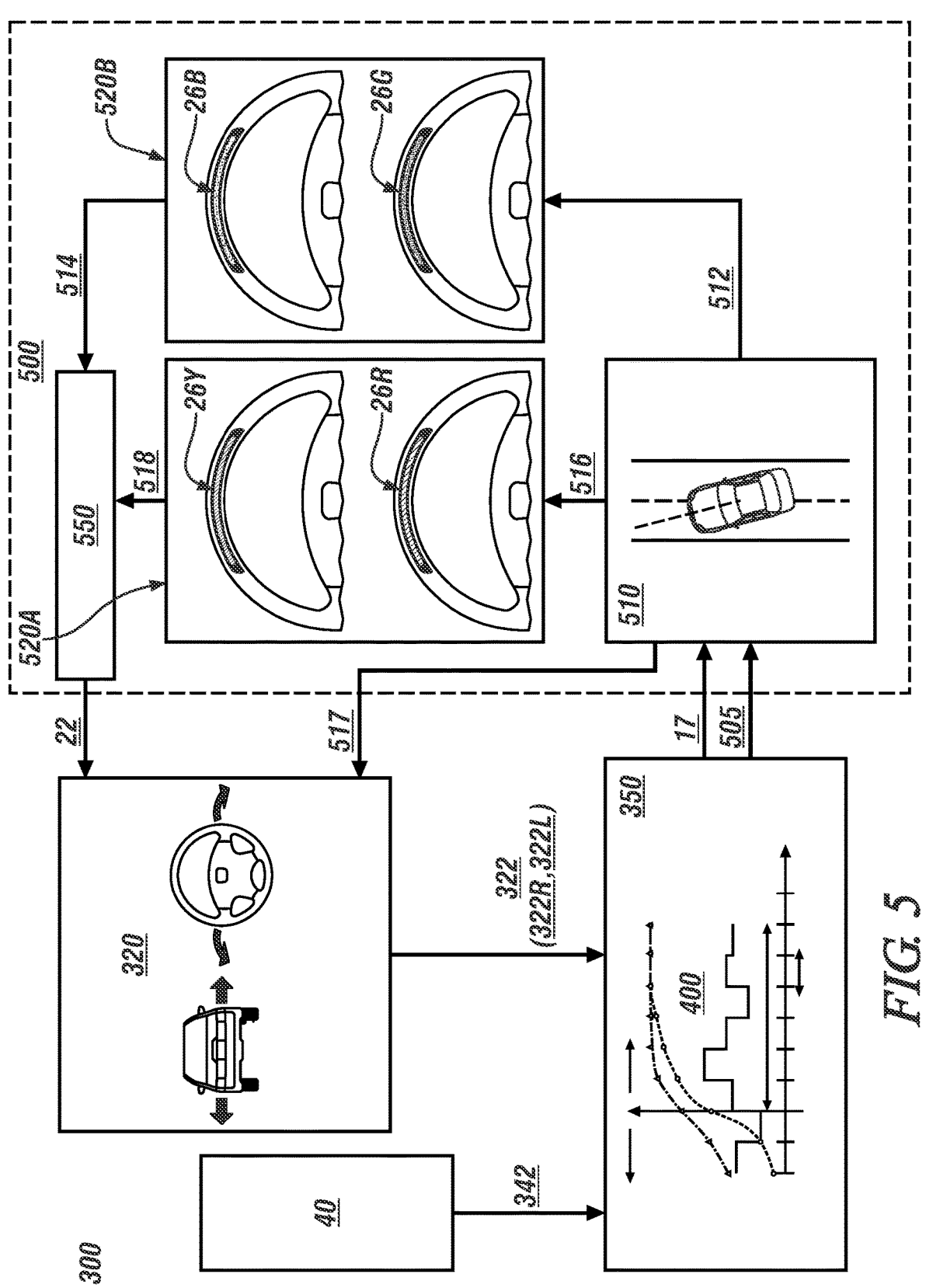
FIG. 5 schematically illustrates elements of a driver steering alert routine that is employable on a vehicle, in accordance with the disclosure.

FIG. 5 schematically illustrates, with continued reference to an embodiment of the vehicle 100 and the collaborative steering subsystem 300, elements of an embodiment of the driver steering alert routine 500, which may include communicating to the driver a need to actively steer the vehicle 100 via the steering wheel 21 under some operating conditions.

The driver steering alert routine 500 includes a constraint violation check 510, a driver intervention request 520A, and an MPC intervention notification 520B.

The constraint violation check 510 employs predictive 350 information from the MPC 400 via the steering control routine 350. The MPC 400 predicts vehicle motion over prediction horizon and performs optimization to minimize violation to the imposed constraints. The degree of constraint violation after optimization may be used by the constraint violation check 510 directly. Other inputs 505 include operation and control parameters derived from the steering actuator 19 coupled to steerable wheel 16 of vehicle 100, the advanced driver assistance system (ADAS) 40 including spatial monitoring system 30 and navigation system 50, the steering controller 18, and V2X communication via the telematics system 70, taking into account the second steering command 342 from the ADAS 40 and the driver steering command 322.

The constraint violation check 510 operates to detect occurrence of a constraint violation 512 of the vehicle trajectory and/or the target path and the target trajectory 341 over a horizon based upon the steering angle command 17 from the collaborative steering subsystem 300 and the other inputs 505. Examples of a constraint violation 512 of the target path and/or the target trajectory 341 over the horizon may include a lateral deviation, a rate of lateral deviation, a heading angle, a yaw rate, etc. that exceeds a respective threshold.

When the constraint violation check 510 indicates there is no pending or existing constraint violation and the driver is actively controlling vehicle steering (512), one or more of the plurality of communication devices 26 may be employed to communicate an MPC intervention request to the driver 550 via one or more of the plurality of communication devices 26 (514). The one or more of the plurality of communication devices 26 may include a colored light bar on a top portion of the steering wheel 21. When the MPC is in process of taking control of vehicle steering, the colored light bar may be controlled to illuminate to a blue color (26B), and when the MPC has taken control of vehicle steering, the colored light bar may be controlled to illuminate to a green color (26G), with the collaborative steering subsystem 300 generating the driver steering command 22.

When the constraint violation check 510 indicates presence of a constraint violation (516), one or more of the plurality of communication devices 26 may be employed to communicate a driver intervention request to the driver 550 (518), wherein the driver steering command 22 is generated by input of the driver 550 to the steering wheel 21. The colored light bar on the top portion of the steering wheel 21. When there is an urgent need for driver steering intervention, the colored light bar may be controlled to illuminate to a red color (26R), and when there is a non-urgent need for driver intervention, the colored light bar may be controlled to illuminate to a yellow color (26Y). In one embodiment, an urgent need for driver steering intervention is defined as indicating an imminent likelihood of a collision with an obstacle. In one embodiment, a non-urgent need for driver steering intervention is defined as indicating a likelihood of a collision with an obstacle in the near future. A path tracking error 517 is provided as input to the driver command routine 320.

In this manner, the driver steering alert routine 500 is able to generate a warning to a driver in advance of a control violation in the form of a lateral deviation, a lateral deviation rate, a yaw rate, and/or a heading angle, which allows the driver to proactively control operation of the vehicle in a timely manner. This may include adjusting the weight of path tracking error proportional to the distance to violation on the horizon. The driver is warned via the plurality of communication devices 26 with either a yellow colored warning lamp or a red colored warning lamp based on if the violation is close or far on the horizon, respectively. Furthermore, after clearing constraint violations, the steering control routine 350 may take control of steering of the vehicle 100 by reducing effect of a driver input to the steering system. This may include reducing a driver steering command by lowering the weight of a path tracking error over a calibratable period of time. Over this period of time the driver is warned with a blue colored warning lamp. Once the weights have been properly adjusted, a green colored warning lamp may be illuminated.

Figure 6:
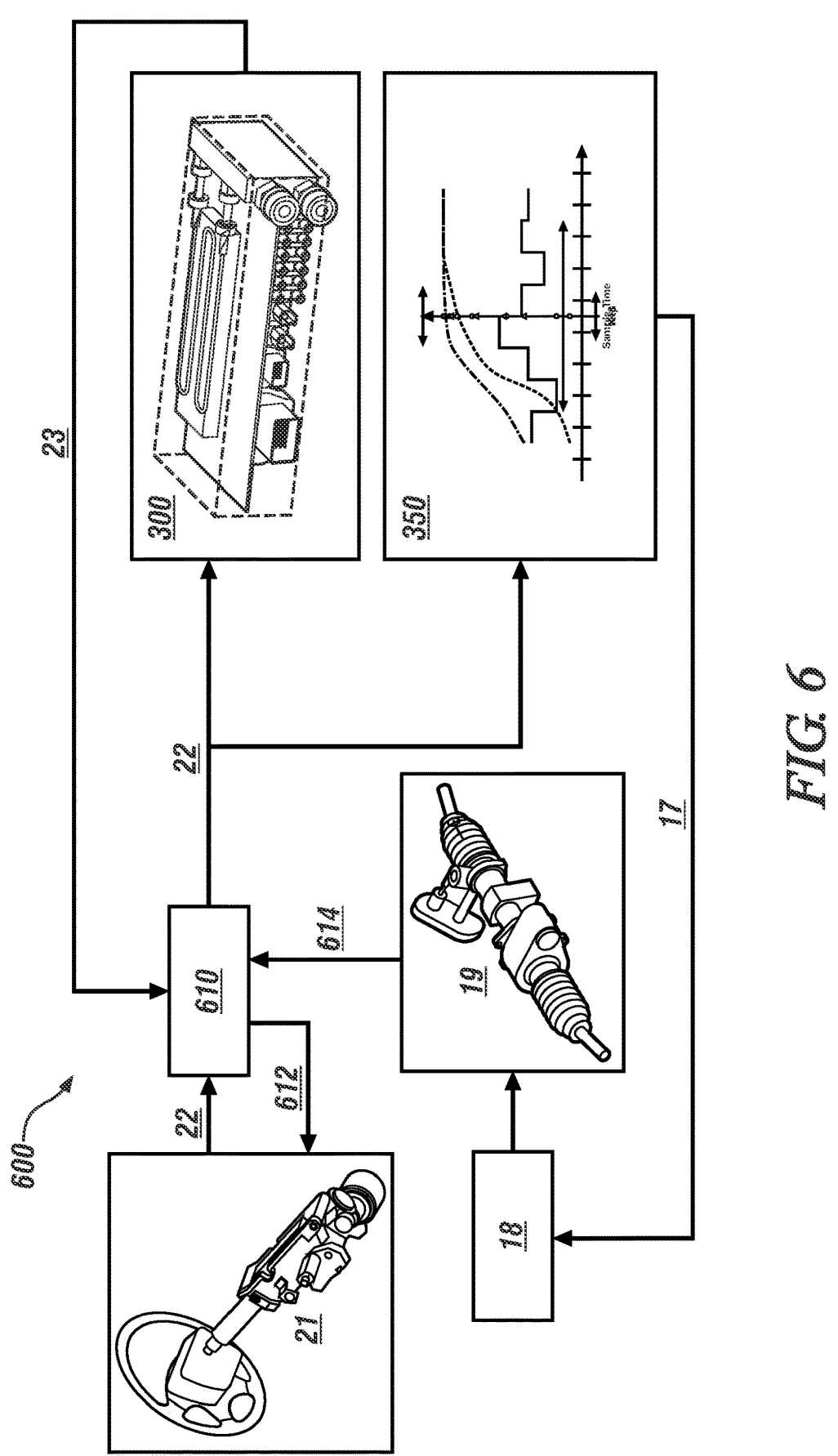
FIG. 6 schematically illustrates elements of a steering emulator routine that is employable on a vehicle.

FIG. 6 schematically illustrates elements of an embodiment of the steering emulator routine 600 for controlling the driver-controllable steering device, e.g., steering wheel 21. The steering emulator routine 600 relates to and is described with reference to an embodiment of the vehicle 100, steering system 15 including the steer-by-wire system described with reference to FIG. 2A, and the collaborative steering subsystem 300.

The steering emulator routine 600 employs the steering controller 18, steering actuator 19, and collaborative steering subsystem 300 including the steering control routine 350 to generate, via emulator 610, a steering wheel torque command 612 that is employed to control the steering wheel 21 to provide a torque resistance in response to the driver steering command 22 in the form of driver applied torque. The steering control routine 350 generates the steering angle command 17 as described herein based at least in part upon the driver steering command 22 including the driver applied torque. The collaborative steering subsystem 300 also provides a steering torque trigger 23.

The steering angle command 17 is input to the steering controller 18 to control the steering actuator 19, which determines a desired steering wheel angle 614 based upon a predetermined calibration that correlates desired steering wheel angle 614 and the steering angle command 17.

The emulator 610 determines the steering wheel torque command 612 based upon the desired steering wheel angle 614, the driver steering command 22, and the steering torque trigger 23, and the steering wheel torque command 612 is employed to control the steering wheel 21 in response thereto.

In this manner, a collaborative steering system may be implemented in a steer-by-wire system. The system consists of collaborative steering trajectory tracking control loop and collaborative steering feel adjustment loop. In the collaborative steering trajectory tracking control loop, desired road wheel angle is determined by the steering control routine 350 using driver applied torque. This command is sent to the steer-by-wire controller, which controls the road wheel and provides feedback to the steering feel adjustment loop on the desired steering wheel angle. In the steering feel adjustment loop, the driver applied torque is processed by a steering feedback function, which generates a trigger to command the emulator to compute a hand wheel torque overlay using the driver applied torque and the desired steering wheel angle.

Furthermore, the concepts provide an architecture and associated method to provide a driver command adaptation logic for different driving assist feature modes. Depending on the nature of the active feature mode such as hands-on/off or continuous/intermittent driving assist, driver command dead-band and driver torque to angle mapping are modified to adjust the amount of driver steering effort to deviate from the driving assist control action. Active feature mode also modifies the amount and duration of the driver command offset to be detected before requesting planning to adjust the path or trajectory through driver requested offset signal. Depending on the active feature mode, driver requested offset (DRO) is withdrawn immediately or after duration when no active driver command is detected.

Furthermore, the concepts provide an architecture and associated method to adapt driver command based upon the steering controller interface. For torque-based steering controller, the MPC steering angle command is first converted to steering torque command before sending to the steering controller. For angle-based steering controller, the MPC steering angle command is sent to the steering controller directly.

Furthermore, the concepts provide an architecture and associated method to automatically adjust the weighting (importance) of driver's steering input in MPC based on driver's preference (selected mode), control tracking performance, environmental conditions and driving scenarios. Depending on the environmental conditions, the weight adjustment can either apply to one side or both sides of the steering direction. This provides an asymmetric or symmetric driving feel when the driver deviates from the MPC steering command. The weight adjustment is giving asymmetric feeling depending on different situations.

Furthermore, the concepts provide an architecture and associated method to improve the MPC prediction model by accounting for the collaborative effect of the driver and MPC on the steering wheel angle. The driver's desired steering angle is estimated using the current angle and applied torque, which is then used to approximate total steering angle in combination with MPC steering command. The steering actuator response to the total commanded steering angle is then modeled and incorporated into the prediction model.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that may direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A steering system for a vehicle, comprising:

a driver-controllable steering device; a power steering actuator coupled to a steerable wheel; an advanced driver assistance system (ADAS) including a spatial monitoring system; and a steering controller;

wherein the steering controller is in communication with the steering device, the power steering actuator, and the ADAS;

the steering controller including a collaborative steering subsystem, the collaborative steering subsystem being operative to:

determine, via the steering device, a driver steering command;

determine, via the ADAS, a target path and a target trajectory for the vehicle based upon an input from the spatial monitoring system;

determine a second steering command based upon the target path and the target trajectory for the vehicle;

determine, via the spatial monitoring system, a plurality of external factors related to the target path and the target trajectory;

determine a weighted driver steering command based upon the plurality of external factors and the driver steering command;

determine, via a steering control routine, a steering angle command based upon the weighted driver steering command and the second steering command; and control the power steering actuator to control the steerable wheel responsive to the steering angle command;

wherein the collaborative steering subsystem being operative to determine the weighted driver steering command based upon the plurality of external factors comprises the steering control routine being operative to:

determine a first weighting factor associated with a first steering direction based upon the plurality of external factors;

determine a second weighting factor associated with a second steering direction that is opposite to the first steering direction based upon the plurality of external factors; and determine the weighted driver steering command based upon the driver steering command, the first weighting factor for the driver steering command, and the second weighting factor for the driver steering command.

2. The steering system of claim 1, wherein the power steering actuator comprises a steer-by-wire steering system.

3. The steering system of claim 1, wherein the power steering actuator comprises a rack-and-pinion steering system.

4. The steering system of claim 1, further comprising a navigation system, wherein the steering control routine is executable to determine, via the ADAS, the target path and a target trajectory for the vehicle based upon the input from the spatial monitoring system and an input from the navigation system.

5. The steering system of claim 1, further comprising the steering control routine being operative to modify the second steering command in response to the weighted driver steering command and the second steering command.

6. The steering system of claim 1, wherein the plurality of external factors related to the target path and the target trajectory comprises a distance to a perceived side threat to the vehicle, or a distance to a perceived obstacle in the target path of the vehicle.

7. The steering system of claim 1, further comprising the steering control routine including a driver steering alert routine operable to detect occurrence of a constraint violation of the target path or target trajectory for the vehicle, and communicate a control action to the driver based upon the constraint violation.

8. The steering system of claim 1, further comprising the steering control routine including a steering emulator routine operable to generate a steering wheel torque command, wherein the steering wheel torque command is employed to control the steering wheel to provide a torque resistance in response to the driver steering command.

9. The steering system of claim 1, wherein the steering control routine executes a model predictive controller routine (MPC) to determine the steering angle command based upon the driver steering command, a weighting factor for the driver steering command, and the plurality of external factors.

10. A method for steering of a vehicle having an advanced driver assistance system (ADAS), the method comprising:

equipping the vehicle with a driver-controllable steering device, a power steering actuator coupled to a steerable vehicle wheel, a spatial monitoring system, and a navigation system;

determining, via the steering device, a driver steering command;

monitoring, via the spatial monitoring system, an area that is proximal to the vehicle;

determining, via a navigation system, travel route information;

determining, via the ADAS, a target path and a target trajectory for the vehicle based upon an input from the spatial monitoring system and the travel route information from the navigation system;

determining a second steering command based upon the target path and the target trajectory;

determining, via the spatial monitoring system, a plurality of external factors related to the target path and the target trajectory;

determining a weighted driver steering command based upon the plurality of external factors;

determining a steering angle command based upon the weighted driver steering command and the second steering command; and controlling the power steering actuator to control the steerable wheel responsive to the steering angle command;

wherein determining the weighting factor for the driver steering command based upon the plurality of external factors comprises:

determining a first weighting factor associated with a first steering direction;

determining a second weighting factor associated with a second steering direction that is opposite to the first steering direction; and determining the weighted driver steering command based upon the driver steering command, the first weighting factor for the driver steering command, and the second weighting factor for the driver steering command.

11. The method of claim 10, wherein the power steering actuator comprises a steer-by-wire steering system.

12. The method of claim 10, wherein the power steering actuator comprises a rack-and-pinion steering system.

13. The method of claim 10, further comprising executing a model predictive controller routine (MPC) to determine the weighted driver steering command based upon the driver steering command, the first weighting factor for the driver steering command, and the second weighting factor for the driver steering command.

14. The method of claim 10, wherein determining the plurality of external factors related to the target path and the target trajectory comprises determining one of a distance to a perceived side threat to the vehicle or a distance to a perceived obstacle in the target path of the vehicle.

15. The method of claim 10, further comprising detecting occurrence of a constraint violation of the target path or target trajectory for the vehicle, and communicating a control action to the driver based upon the constraint violation.

16. The method of claim 10, further comprising generating, via a steering emulator routine, a steering wheel torque command that is employed to control the steering wheel to provide a torque resistance in response to the driver steering command.

17. A method for controlling steering on a vehicle, the method comprising:

equipping the vehicle with a driver-controllable steering device, a power steering actuator coupled to a steerable vehicle wheel, an advanced driver assistance system (ADAS) including a spatial monitoring system, and a navigation system;

determining, via the ADAS and the navigation system, a target path and a target trajectory for the vehicle;

determining a second steering command based upon the target path and the target trajectory for the vehicle;

determining, via the steering device, a driver steering command;

determining, via the spatial monitoring system, a plurality of external factors related to the target path and the target trajectory;

determining a weighted driver steering command based upon the plurality of external factors, including:

determining a first weighting factor associated with a first steering direction, determining a second weighting factor associated with a second steering direction that is opposite to the first steering direction, and determining the weighted driver steering angle command based upon the driver steering command, the first weighting factor for the driver steering command, the second weighting factor for the driver steering command, and the driver steering command;

executing a model predictive controller routine (MPC) to determine a steering angle command based upon the weighted driver steering command, the target path, and the target trajectory; and controlling the power steering actuator to control the steerable wheel responsive to the steering angle command.

18. The method of claim 17, wherein determining, via the spatial monitoring system, the plurality of external factors related to the target path and the target trajectory comprises determining one of a distance to a perceived side threat to the vehicle and a distance to a perceived obstacle in the target path of the vehicle.

19. The method of claim 17, further comprising a driver steering alert routine operable to detect occurrence of a constraint violation of the target path or target trajectory for the vehicle, the method further comprising communicating, via the driver steering alert routine, a control action to the driver based upon the constraint violation.

20. The method of claim 17, further comprising a steering emulator routine operable to generate a steering wheel torque command, the method further comprising controlling, via the steering wheel torque command, the steering wheel to provide a torque resistance in response to the driver steering command.

\* \* \* \* \*